March 16, 1965
F. L. FERRANTO
3,174,091
WELD ENERGY CONTROL DEVICE
Filed Aug. 16, 1962
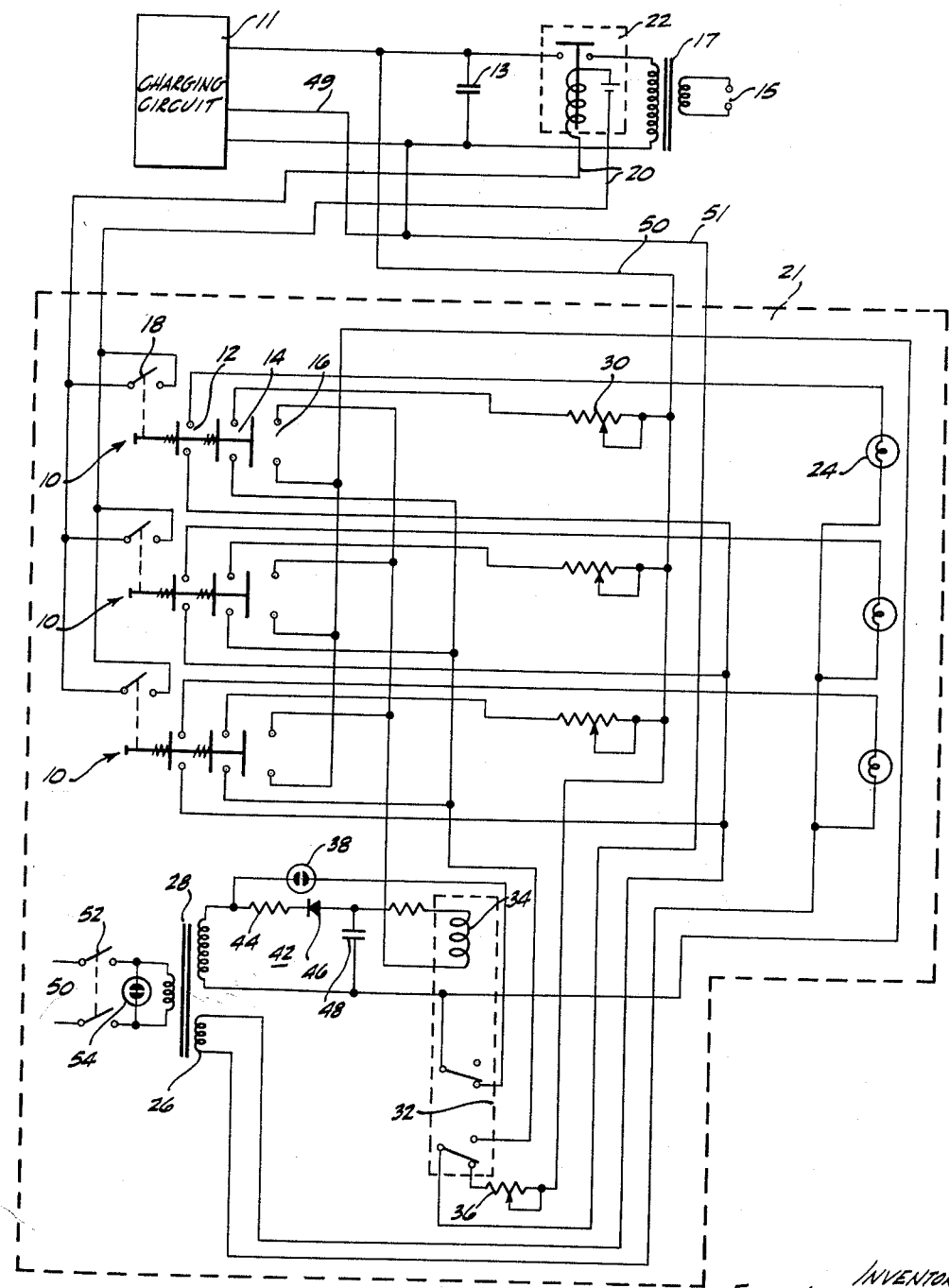
INVENTOR
FELIX L. FERRANTO,
Walter R. Thiel
ATTORNEY.

United States Patent Office 3,174,091
Patented Mar. 16, 1965

3,174,091
WELD ENERGY CONTROL DEVICE
Felix L. Ferranto, Vista, Calif., assignor to Hughes Aircraft Company, Culver City, Calif., a corporation of Delaware
Filed Aug. 16, 1962, Ser. No. 217,334
3 Claims. (Cl. 320—1)

This invention relates to a weld energy control device for an electric resistance welding system and more particularly to a device to control the energy stored in the energy storage capacitor bank of the power supply of the system.

Recent advances in the techniques for construction of semiconductor components such as transistors have necessitated the design of a reliable system for controlling the weld energy of an electric welding system so that the energy level can be predetermined and the system subsequently operated with an assurance that the same amount of energy will be delivered by the power supply for each operation. Therefore, because of the increased use of electric welders and since most of the old and known methods for controlling the weld energy of electric welding systems depend upon the skill and knowledge of the operator for their control, it is necessary that a system be developed that can be operated by an unskilled person.

It is therefore an object of this invention to provide a precalibrated means to control the power output from the power supply of an electric welding system.

It is another object of this invention to provide a plurality of means each capable of a random selection of a precalibrated specific and duplicable power output for the power supply of an electric welding system.

In general, the present invention comprises a plurality of separate randomly selectable precalibrated control elements each coupled to the power supply of an electric welding system to control the power output of said power supply and a sequence operable means coupled to each of the preselected control elements to actuate such control element as one step in a sequence of operations.

Other advantages of the invention will hereinafter become more fully apparent from the following description of the drawing which illustrates a preferred embodiment of the present invention and wherein is shown a block diagram of a welding system and a schematic circuit diagram illustrating the details of one type of control circuit employable in the welding system.

Referring to the drawing, an electric resistance welding system comprises a charging circuit 11 which typically may include a pair of conventional thyratrons or semiconductor rectifiers. The charging circuit charges a capacitor 13 which is discharged through the operation of an actuator 22 such as a mechanical switch or as illustrated in the drawing an electrical relay to provide a welding pulse to a load circuit 15 through a coupling transformer 17. Such a welding system is shown and described in detail in U.S. Patent No. 2,483,691 by J. W. Dawson issued October 4, 1949. To provide an improved control of the charging of the capacitor 13, a control circuit 21 is connected across the capacitor 13 by a pair of conductors 50, 51 and to the charging circuit 11 by a conductor 49. Although any suitable arrangement for controlling the output of the charging circuit may be employed depending upon the type of charging circuit, if a conventional thyratron charging circuit having a phase shift circuit controlling the thyratron grids is employed, the control circuit may be used to control the phase shift circuit and thereby control charging of the welding capacitor.

While the present invention includes a plurality of random selectable precalibrated control circuits for the power output of an electric welding system, this arrangement is only included for clarity of description since the specific elements shown and their arrangement may be changed without varying from the scope of the present invention.

The control circuit 21 includes a plurality of sequence operable means illustrated as three push-button switches 10 of the multicontact type such as a Model 71 manufactured by Switchcraft, Inc. While a circuit including three switches has been shown, it should be understood that this is only representative of a typical arrangement and that as many switches as desirable may be used in accordance with the principles of the present invention.

Since each of the switches is identical in its operation and has similar components coupled to it, the following description will be limited to the arrangement and operation of a single switch.

The multicontact switch 10 includes a first, a second and a third pair of contacts 12, 14, 16, each of which is actuatable in a predetermined sequence. As viewed schematically in the drawing, as the push-button actuator of the switch 10 is displaced, a microswitch 18 coupled with the shaft of the push-button switch is actuated. The microswitch 18 is connected by a pair of conductors 20 to the welder actuator 22 so that when the switch 10 is activated by advancing the push-button the capacitor 13 is discharged through the discharge circuit including the primary winding of transformer 17. A further advance of the push-button completes the first pair of contacts 12 to which is coupled an indicator light 24 and a source of power 26 for the light shown typically as a portion of the secondary winding of a conventional transformer 28. In the preferred embodiment the indicator light is an intricate part of the bush-button mechanism and when the contacts 12 are closed the button itself is illuminated to indicate that a particular push-button has been selected. However, it should be understood that the light need not be located in any specific location as long as it will serve to indicate a particular button selection.

After the energization of the light 24 a further advance of the push-button switch 10 completes the second pair of contacts 14 which have coupled to it a control element 30 shown typically as a potentiometer and a positive switching device 32 illustrated as a double pole double throw relay.

While the control element 30 has been illustrated as a potentiometer, it should be understood that other variable impedance control elements such as a variable transformer or a capacitor may be substituted therefor, depending upon the specific nature and type of the components of the charging circuit.

For an example, when a thyratron charging circuit is used to charge the welding capacitor 13 a comparator circuit including a dual triode or its equivalent and a potentiometer to control the operation of the triode is coupled to the capacitor 13 to sense the charge thereon and to compare it with a reference voltage to develop a control pulse which is applied through a phase shift circuit to the grids of thyratrons to control the output of the capacitor charging circuit. However, when solid state rectifiers are substituted for the thyratrons of the charging circuit the comparator circuit and phase shift circuits are eliminated and the output of the capacitor charging circuit may be controlled by a variable transformer in the primary of a conventional regulating transformer which supplies the power to the charging circuit.

Now a further advance of the shaft of the push-button switch 10 completes the third pair of contacts 16 which are coupled to the energizing coil 34 of the relay 32. As the third set of contacts are completed a latching means (not shown) may be used to latch the push-button in the advanced position thus maintaining all three pairs of contacts in a closed circuit condition. In addition, the plurality of switches may incorporate a lockout bar (not shown) which operates after selection and depression of any one of the switches to prevent a simultaneous operation of any other one of the switches.

The relay 34 provides a dual function in the operation of the control circuit. An auxiliary control element illustrated as a potentiometer 36 is attached to one contact of the relay which is maintained in a normally closed position. While the auxiliary control element 36 has been shown typically as a potentiometer, like the control element 30, other variable control elements may be substituted therefor depending upon the nature of the specific charging circuit.

The auxiliary control element like the control element 30 is connected across the welding capacitor 13 by the pair of conductors 50, 51 and to the charging circuit by the conductor 49. Coupled to a second pair of contacts so that it will be energized when the relay 32 is in a first or de-energized position is an auxiliary control indicator light 38. Thus, when the relay is in its de-energized position the auxiliary control element 36 is coupled to the charging circuit 11 and the indicator light 38 is energized. When the push-button shaft of the switch 10 reaches the position to complete the third pair of contacts 16, the coil 34 of the relay 32 is energized to move the relay contacts into an energized or second position which disconnects the auxiliary control element 36 from the charging circuit and connects the selected control element 30 thereto and de-energizes the indicator light 38. To provide the actuation for the relay 32 a rectifier circuit 42 including a resistor 44, a diode 46, and a capacitor 48 is coupled to the secondary of the power transformer 28. The primary of the transformer 28 is connected to a source of electrical power 50 such as 110 volts A.C. and has in series with it an operation switch 52 and in parallel an indicating light 54 to render a visual indication when the circuit is energized.

To calibrate each of the push-button switches to a desired weld energy, one of two methods is utilized. In a first method the particular push-button on which it is desired to set a particular welding charge or heat is engaged by pushing it until it locks in its latched position. Then the specific value of the control element associated with the particular switch is changed such as by rotating the shaft of the element 30 by hand or by a screwdriver and test welds are made until the desired welding result is obtained. It is desirable to prevent unnecessary adjustments by unskilled persons to provide a control element 30 having a screwdriver adjustable shaft rather than a hand adjustable shaft.

In a second method for calibrating to a desired heat setting the auxiliary control element 36 and a conventional electric energy indicating meter (not shown) such as a conventional watt second meter connected in parallel with the capacitor 13 are utilized. In this method all push-button switches are released from their latch position and with the auxiliary control element indicator light 38 energized the specific value of the auxiliary control element 36 is varied to obtain the desired heat level to perform a particular weld. Once this has been obtained the operator notes the energy level indicated on the watt second meter. Now the push-button on which it is desired to place this particular weld energy is depressed until it locks into position and the specific value of the corresponding control element is varied and test welds made until the reading previously noted is again indicated on the watt second meter.

I claim:

1. In combination with an electric resistance welding system including a capacitor, a charging circuit therefor and a load circuit adapted to be energized by said capacitor, a circuit to control the operation of said charging circuit comprising:
    a plurality of control means each separately coupled to said charging circuit to control the charging of said capacitor to provide a plurality of random selectable precalibrated charge levels for said capacitor;
    and a sequence operating switch coupled to each of said control means to actuate said means as one step in a sequence of operations.

2. In combination with an electric resistance welding system including a capacitor, a charging circuit therefor and a load circuit adapted to be energized by said capacitor, a circuit to control the operation of said charging circuit, comprising:
    a plurality of potentiometers, each coupled to the charging circuit to control the charging of said capacitor to provide a plurality of random selectable precalibrated charge levels for said capacitor;
    and sequence operable means coupled to each of said potentiometers, including a relay to actuate said potentiometer and adapted to be energized as the last step in the sequence of operations.

3. In combination with an electric resistance welding system including a capacitor, a charging circuit therefor and a load circuit adapted to be energized by said capacitor, a circuit to control the operation of said charging circuit, comprising:
    a plurality of potentiometers, each separately coupled to the charging circuit to control the charging of said capacitor to provide a plurality of random selectable precalibrated charge levels for said capacitor;
    a sequence operable means coupled to each of said potentiometers, including a relay to actuate said potentiometer and adapted to be energized as the last step in the sequence of operations;
    and a switch means adjacent to said sequence operable means to discharge said capacitor as the first step in the sequence of operation of said sequence operable switch.

References Cited by the Examiner
UNITED STATES PATENTS
3,108,178    10/63    Kelemen et al. _____ 320—1

IRVING L. SRAGOW, Primary Examiner.